(12) United States Patent
Petersen (10) Patent No.: US 7,451,673 B1
(45) Date of Patent: Nov. 18, 2008

(54) INDEXABLE PLIERS-TYPE TOOL

(75) Inventor: Keith A. Petersen, Hilbert, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 11/893,225

(22) Filed: Aug. 15, 2007

(51) Int. Cl.
*B25B 7/02* (2006.01)
*B25B 7/06* (2006.01)
*H02G 1/12* (2006.01)

(52) U.S. Cl. .......................................... 81/305; 81/416
(58) Field of Classification Search ........... 81/303–307, 81/416, 177.8, 9.4, 9.44; 30/90.1, 91.2
See application file for complete search history.

(56) References Cited

U.S. PATENT DOCUMENTS

| | | |
|---|---|---|
| 208,878 A | 10/1878 | Allen et al. |
| 641,118 A | 1/1900 | Kelly |
| 691,830 A | 1/1902 | Whitely et al. |
| 816,674 A * | 4/1906 | Medhus .......................... 7/133 |
| 928,375 A | 7/1909 | Frick |
| 944,578 A | 12/1909 | Paul |
| 1,079,997 A | 12/1913 | Wernimont |
| 1,334,425 A | 3/1920 | Wernimont |
| 1,514,488 A | 11/1924 | Wernimont |
| 2,446,022 A | 7/1948 | Peterson |
| 2,651,227 A | 9/1953 | Kennington, Jr. |
| 2,921,773 A | 1/1960 | Hoelzer |
| 4,530,262 A | 7/1985 | Pownall |
| 4,929,113 A | 5/1990 | Sheu |
| 5,245,721 A | 9/1993 | Lowe et al. |
| 5,280,659 A | 1/1994 | Park |
| 5,419,221 A | 5/1995 | Cole |
| 5,520,474 A | 5/1996 | Liu |
| 5,551,745 A | 9/1996 | Huang |
| 5,775,184 A | 7/1998 | Cole |
| 5,806,933 A | 9/1998 | Tsui et al. |
| 5,820,288 A | 10/1998 | Cole |
| 5,867,911 A | 2/1999 | Yates et al. |
| 5,941,141 A | 8/1999 | Whitley |
| RE36,407 E | 11/1999 | Rocco |
| 6,023,805 A | 2/2000 | Lin |
| 6,032,555 A | 3/2000 | Whitley |
| D424,900 S | 5/2000 | Budrow et al. |
| 6,101,907 A | 8/2000 | McGovern et al. |
| D433,608 S | 11/2000 | Poehlmann et al. |
| 6,161,982 A | 12/2000 | Cole |
| 6,216,565 B1 | 4/2001 | McCann |
| 6,223,374 B1 | 5/2001 | Lin |
| D454,474 S | 3/2002 | Montague |
| 6,389,626 B1 | 5/2002 | Hung |

(Continued)

*Primary Examiner*—David B Thomas
(74) *Attorney, Agent, or Firm*—Seyfarth Shaw LLP (57) ABSTRACT

An indexable pliers-type tool with selectable first and second jaw tool structures comprising opposing jaw elements having first and second portions with handles, the first portions defining a first tool structure, the second portions defining a second tool structure, the jaw elements are adapted to be pivotally moveable relative to each other about an axis, each handle has a handle aperture therein coaxial with jaw apertures, and a pivot pin is disposed axially through the jaw apertures and the handle apertures and is axially movable between locked and unlocked positions, wherein when the pin is in the locked position, the first or second tool structure can be used, and when the pin is disposed in the unlocked position, the jaw elements can be rotated for tool structure selection.

24 Claims, 10 Drawing Sheets

U.S. PATENT DOCUMENTS

| | | |
|---|---|---|
| 6,405,395 B1 | 6/2002 | Poehlmann et al. |
| 6,647,835 B1 | 11/2003 | Tseng |
| 6,721,983 B2 | 4/2004 | Dallas et al. |
| 6,725,748 B1 | 4/2004 | Tseng |
| D494,825 S | 8/2004 | Hernandez |
| 6,786,117 B1 | 9/2004 | Tseng |
| 6,789,452 B1 | 9/2004 | Tseng |
| 6,840,141 B2 * | 1/2005 | Cole ................ 81/177.8 |
| 6,976,412 B1 * | 12/2005 | Yu ..................... 81/302 |
| 7,156,003 B2 * | 1/2007 | Cole ................ 81/177.8 |
| 2002/0023524 A1 | 2/2002 | Lowe et al. |
| 2003/0079576 A1 | 5/2003 | Lo |

* cited by examiner

INDEXABLE PLIERS-TYPE TOOL

BACKGROUND OF THE INVENTION

The present application relates generally to pliers-type tools, and more particularly to pliers-type tools having an adjustable or indexable tool head that is rotatable relative to the tool's handles.

Pliers-type tools typically comprise opposing first and second handles that are respectively integral with first and second jaw elements that form a jawed tool, such as, for example, pliers, wire cutters, wire strippers, and the like. A pivot joint is typically defined adjacent to the first and second jaw elements so the handles and jaw elements are pivotally movable relative to each other. Well known opening and closing movement of the handles causes open and closing movement of the jawed tool formed by the jaw elements.

It is well known to have a combination pliers tool having diametrically opposing jawed tools that are selectable to either use or non-use positions by rotating the handles 180° about a pivot axis relative to the tool head. Such a tool is shown in U.S. Pat. No. 5,245,721. However, the jawed tools can only be moved to one of two positions—a use position, wherein the jawed tool is adapted to be usable in a well-known manner via the opposing handles, or a non-use position. Such tool, however, cannot rotate the tool head to any one of a plurality of angular orientations relative to the handles.

It is also well known to have a tool head that is rotatable to any one of a plurality of angular positions relative to a single handle with an axially movable splined pin, such as is disclosed in U.S. Pat. No. 5,419,221. However, such tools do not facilitate movement of a tool head formed of two opposing jaws relative to two handles, wherein the handles are adapted to be respectively fixedly interconnected to the jaws, thus forming a pliers-type tool.

There is therefore a need for a pliers-type tool having a tool head that is adapted to be rotated to and usable in any one of a plurality of angles relative to the tool's handles.

SUMMARY OF THE INVENTION

The present application discloses a pliers-type tool that includes first and second handles that are adapted to be fixedly interconnectable with a jaw-type tool head that is formed by opposing first and second jaw elements. The tool head can be locked in any angular position relative to the handles via an axially moveable pin that is disposed in co-axial apertures disposed in the handles and the jaw elements.

In an embodiment, the pin includes first, second and third externally splined portions. The second externally splined portion is rotatable relative to the first and third externally splined portions and the third externally splined portion is axially spaced relative to the second externally splined portion. In an embodiment, each of the apertures in the handles and the jaw elements includes an inner surface with circumferentially disposed internal splines that are engageable with the externally splined portions. The pin is axially movable along a pivot axis, defined by the coaxial alignment of the apertures, between a locked position, wherein the relative well-known pivotal movement of the handles about the axis causes relative movement of the jaw elements, and an unlocked position, wherein the tool head can be rotated to any one of a plurality of angular positions relative to the handles.

When the pin is in the locked position, the pliers-type tool is in the "use" condition and the first externally splined portion fixedly interconnects the first handle with the first jaw element, and the second externally splined portion fixedly interconnects the second handle with the second jaw element. It will thus be appreciated that, when the pin is in the locked position, relative pivotal movement of the handles in a well-known manner about the axis causes relative pivotal movement of the jaw elements of the tool head about the axis, due to the rotatability of the second externally splined portion relative to the first externally splined portion.

When the user desires to modify the tool head's angular position relative to the handles, the pin is moved axially along the axis to the unlocked position, wherein the first externally splined portion is coupled to the first handle, the second externally splined portion fixedly interconnects the first and second jaw elements, and the third externally splined portion is coupled to the second handle. Because the first and third externally splined portions are not rotatable relative to each other, the first and third externally splined portions fixedly interconnect the first and second handles with each other. Moreover, because the second externally splined portion is rotatable relative to the first and third externally splined portions, the tool head, formed by the first and second jaw elements, is pivotable about the axis relative to the handles to facilitate angular modification of the tool head relative to the handles. After rotating the tool head to the desired angular position relative to the handles, the user can axially move the pin to the locked position, thus returning the pliers-type tool to the "use" condition, as described above.

In another embodiment, the tool head may comprise first and second diametrically opposing jaw sets, each jaw set forming a different jawed tool structure. For example, the first tool structure may define a wire cutting tool and the second tool structure may define a wire stripping tool. It will be appreciated that by pivotally moving the tool head relative to the handles about the axis, as described above, the user can select the angular position of the first and second tool structures relative to the handles.

DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages, should be readily understood and appreciated.

DETAILED DESCRIPTION

There is disclosed herein a pliers-type tool having two opposing handles and a jawed-type tool head that is adapted to be rotated to any one of a plurality of angular positions relative to the handles. Referring to the figures, the pliers-type tool 20 includes first and second handles 21, 22 and a tool head 23 that is formed by first and second opposing jaw elements 24, 25. First jaw element 24 includes first and second jaw portions 24a, 24b, and second jaw element 25 includes first and second jaw portions 25a, 25b. The first portions 24a, 25a of jaw elements 24, are disposed in juxtaposed relation to each other to cooperatively form a first jaw defining a first jawed-tool structure 26. It will be appreciated that while a conventional wire stripping jawed-tool structure is shown in the figures, any type of jawed-tool structure defined by two opposing jaw elements may be used with the pliers-type tool 20 of the present application. In an embodiment, the first and second jaw elements 24, 25 can be identically constructed in order to minimize manufacturing and assembly costs, but disposed in inverse juxtaposed relation to define the desired jawed-tool structure.

Each of the jaw elements 24, 25 includes a jaw aperture 27 disposed therein. In an embodiment, the jaw apertures 27 are disposed in the respective second portions 24b, 25b. The respective jaw apertures 27 of the jaw elements 24, 25 are disposed in substantial coaxial alignment relative to each other having a common pivot axis A, wherein the second portions 24b, 25b are disposed in substantially superposed relation. The jaw elements 24, 25 are adapted to be pivotally moveable relative to each other about the pivot axis A when the pliers-type tool 20 is in a use condition, as described in further detail below. In an embodiment, each of the jaw apertures 27 includes a plurality of jaw element internal splines 28 circumferentially disposed on inner surfaces thereof that protrude radially inwardly toward the pivot axis A.

The first and second handles 21, 22 are adapted to be respectively fixedly interconnected with the first and second jaw elements 24, 25. In an embodiment, each of the first and second handles 21, 22 includes a handle aperture 30 disposed in respective first ends 21a, 22a thereof. The handle apertures 30 are substantially coaxially aligned with the jaw element apertures 27. In an embodiment, each of the handle apertures 30 includes a plurality of handle internal splines 31 disposed on an inner surface thereof that protrude radially inwardly toward the pivot axis A. The first and second handles 21, 22 are adapted to be pivotally moveable relative to each other about the pivot axis A when the pliers-type tool 20 is in a use condition, as described in further detail below.

The pliers-type tool 20 includes a pivot pin 40 disposed axially through the jaw element apertures 27 and the handle apertures 30 along the pivot axis A and is axially movable along the pivot axis A relative thereto between a locked position (as seen in FIGS. 1, 4, 5A and 9) and an unlocked position (as seen in FIGS. 2, 3, 6, and 10). When the pivot pin 40 is disposed in the locked position, the pliers-type tool 20 is in the "use" condition, wherein the first handle 21 is fixedly interconnected with the first jaw element 24 and the second handle 22 is fixedly interconnected with the second jaw element 25, so that the second handle 22 and the second jaw element 25 are pivotally movable together relative to the first handle 21 and the first jaw element 24 about the pivot axis, wherein relative pivotal movement of the handles 21, 22 about the pivot axis A in a well-known manner causes relative movement of the jaw elements 24, 25 in a well-known opening and closing manner. When the pivot pin 40 is disposed in the unlocked position, the first and second handles 21, 22 are fixedly interconnected with each other and the jaw elements 24, 25 are fixedly interconnected with each other, so that the jaw elements 24, 25 are pivotally movable together about the pivot axis A relative to the handles 21, 22. It will thus be appreciated that by disposing the pivot pin 40 in the unlocked position, the user can rotate the first jawed tool structure 26, defined by the first portions 24a, 25a of jaw elements 24, 25, relative to the handles 21, 22. It will further be appreciated that when the first jawed tool structure 26 is disposed in a desired angular position relative to the handles 21, 22, the user can axially move the pivot pin 40 to the locked position, so that the pliers-type tool 20 is in a "use" condition, as described herein.

Referring to FIGS. 6-9, in an embodiment, the pivot pin 40 includes a first externally splined portion 41 having a plurality of radially outwardly extending first external splines 42 defining a first splined portion outer diameter, and a second externally splined portion 43 adjacent to the first externally splined portion 41 having a plurality of radially outwardly extending second external splines 44 defining a second splined portion outer diameter that is substantially the same as the first splined portion outer diameter. In an embodiment, the second externally splined portion 43 is rotatable relative to the first externally splined portion 41. The pivot pin 40 may also include a third externally splined portion 45 having a plurality of radially outwardly extending third external splines 47 that define a third portion outer diameter that is substantially the same as the first portion outer diameter. The third externally splined portion 45 is axially spaced relative to the second externally splined portion 42 and is nonrotatable relative to the first portion 41. In an embodiment, the second externally splined portion 43 is axially spaced from the third externally splined portion 45 by a substantially smooth portion 48 having an outer diameter that is less than the first splined portion outer diameter.

Figure 8:
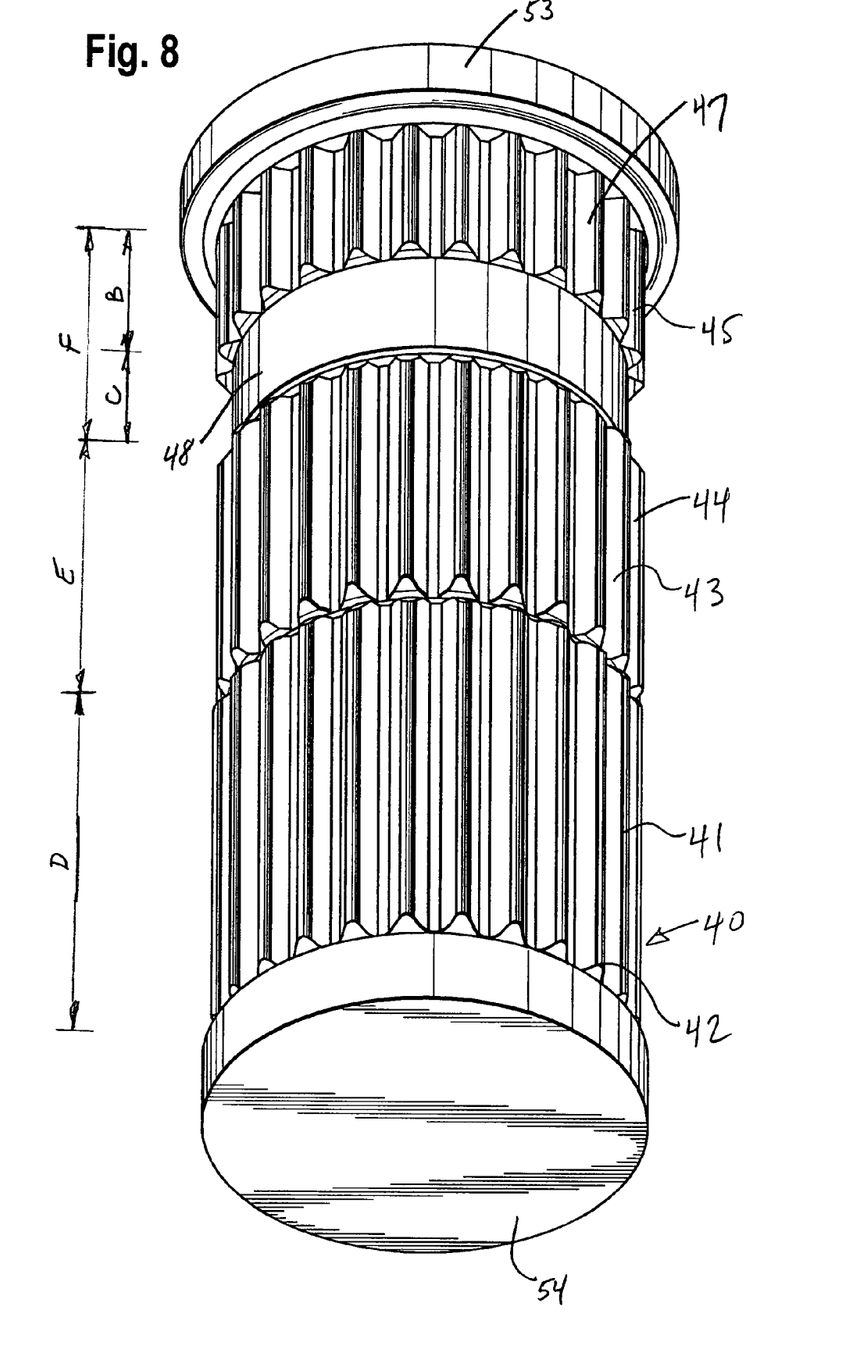
FIG. 8 is a view similar to FIG. 7, but depicting the pin in an assembled condition.

In an embodiment, the smooth portion 48 and the third externally splined portion 45 have respective axial smooth portion length B and third portion length C, the lengths B, C being substantially the same. The first externally splined portion 41, the second externally splined portion 45 and the third externally splined portion 47 are each adapted to meshingly engage the jaw element internal splines 28 and the handle internal splines 31, as discussed below. Referring particularly to FIG. 8, the first externally splined portion 41, the second externally portion 43 and the third externally splined portion 45 have respective first axial length D, second axial length E, and third axial length F. In an embodiment, the third axial length F is shorter than the second axial length E, and the second axial length E is shorter than first axial length D.

Figure 1:
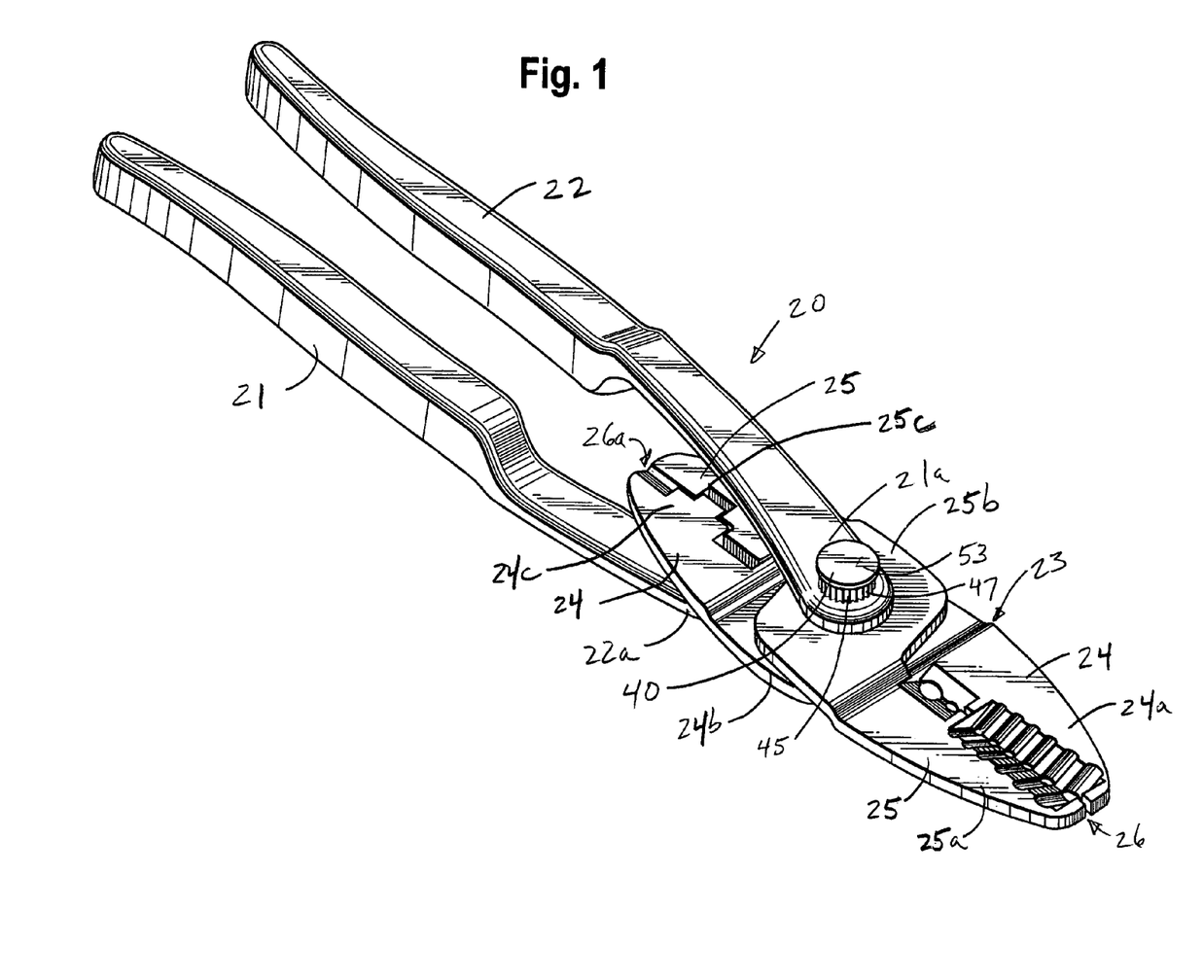
FIG. 1 is a perspective view of an embodiment of the adjustable jaw pliers type of the present application, depicted with a tool head having two opposing jaw sets defining two jawed tools.
Figure 2:
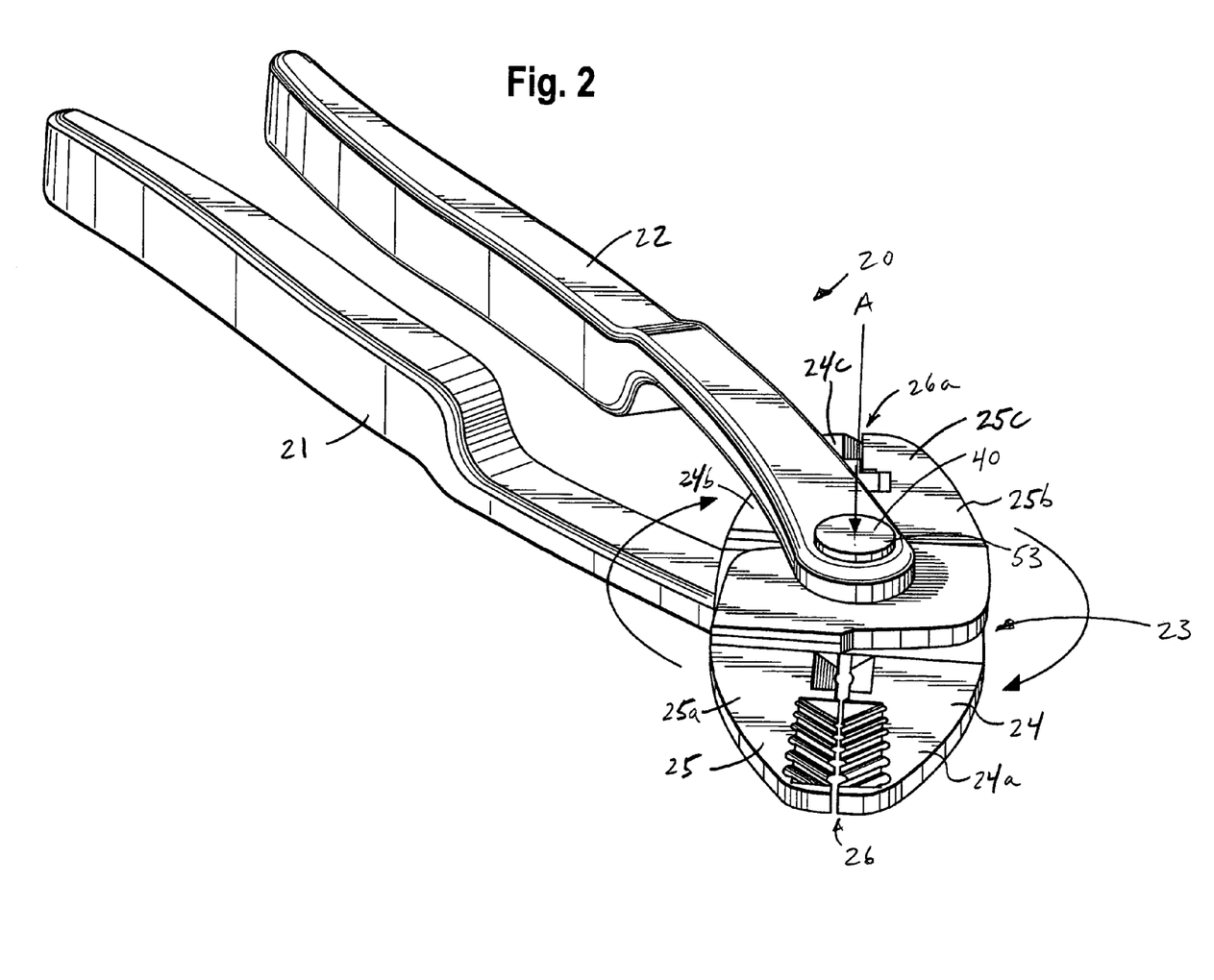
FIG. 2 is a view similar to FIG. 1, but depicting the pin in the unlocked position and the tool head being rotated relative to the handles.
Figure 3:
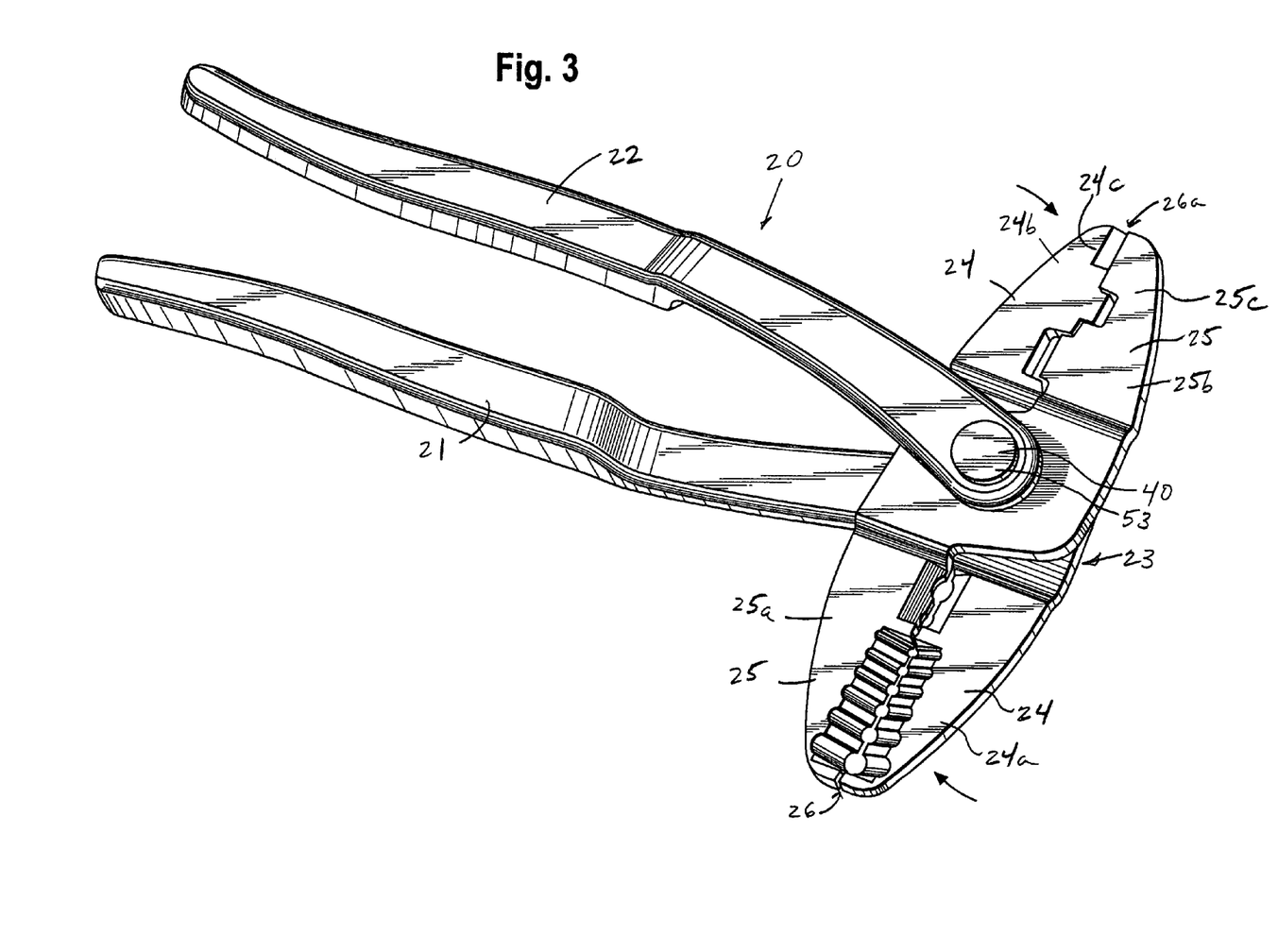
FIG. 3 is a view similar to FIG. 2 depicting further rotational movement of the tool head relative to the handles.
Figure 4:
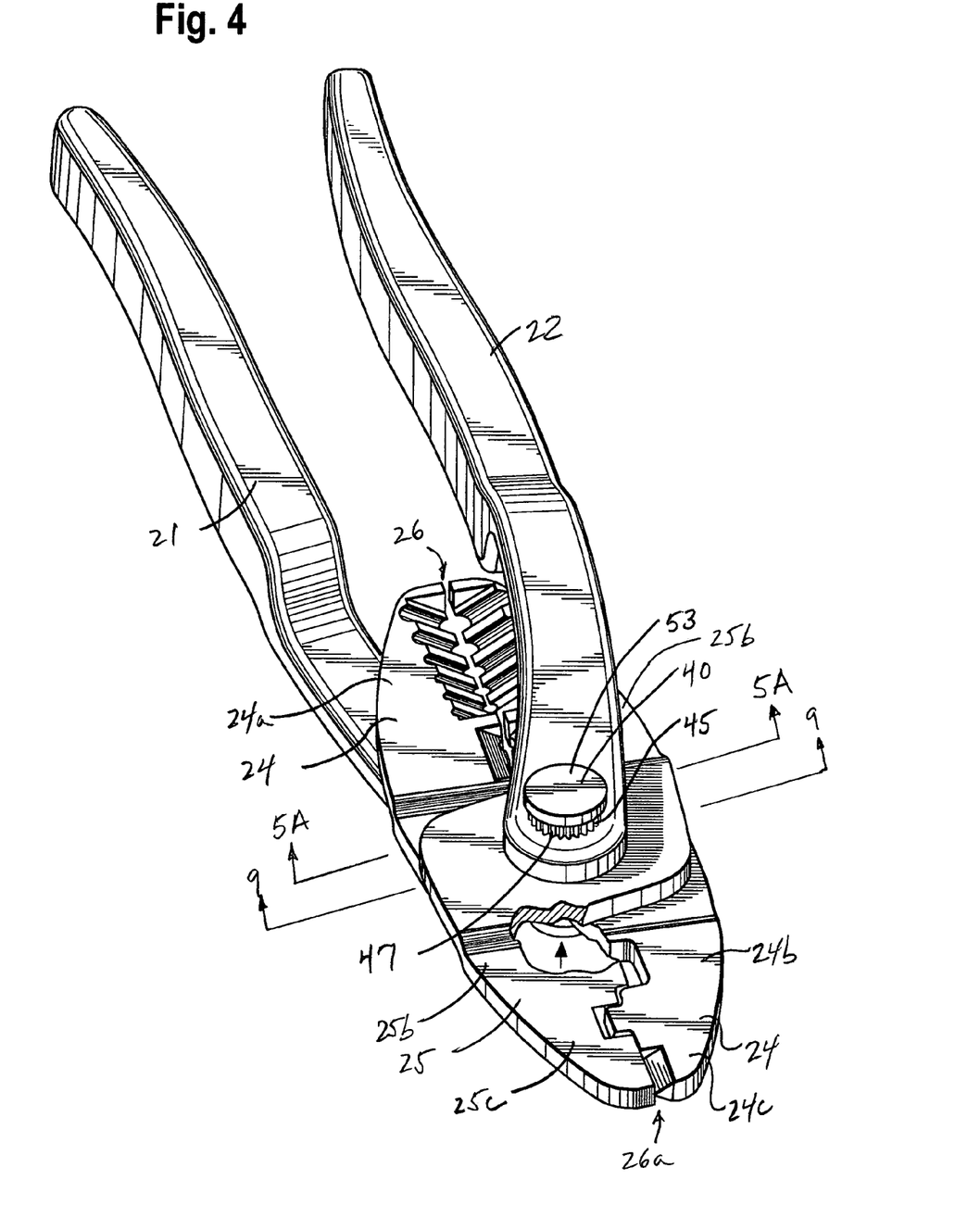
FIG. 4 is a view similar to FIG. 3 depicting further rotational movement of the tool head relative to the handles and the pin in the locked position.
Figure 5A:
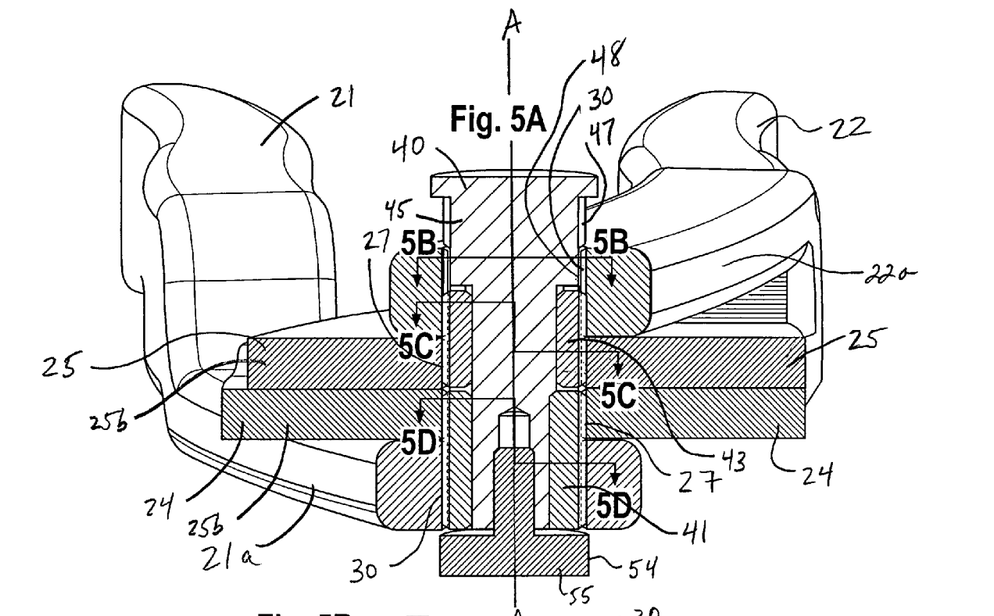
FIG. 5A is an enlarged cross-sectional view taken along line 5A-5A in FIG. 4.
Figures 5B, 5C, 5D:
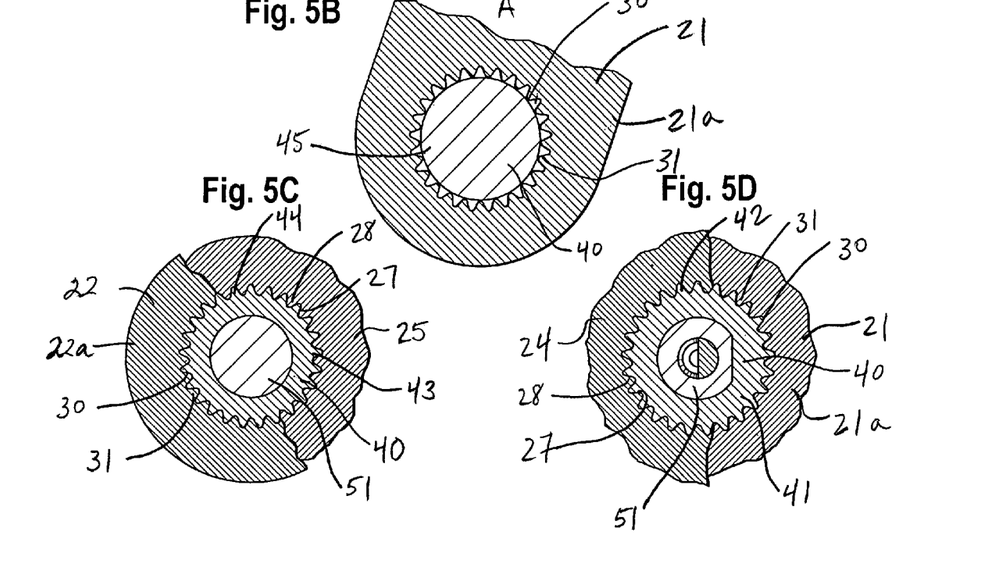
FIG. 5B is a cross-sectional view taken along line 5B-5B in FIG. 4.
FIG. 5C is a cross-sectional view taken along line 5C-5C in FIG. 4.
FIG. 5D is a cross-sectional view taken along line 5D-5D in FIG. 4.
Figure 9:
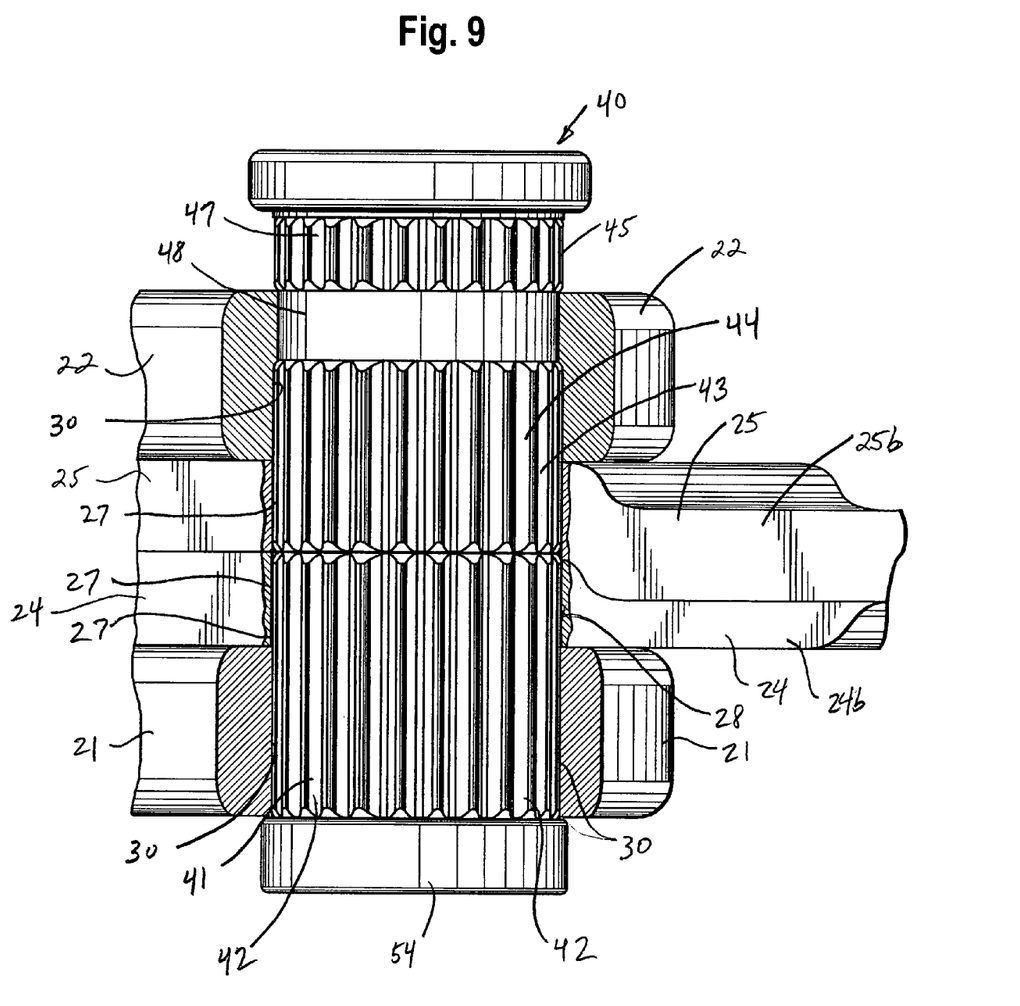
FIG. 9 is an enlarged cross-sectional view taken along line 9-9 in FIG. 4.

As shown in FIGS. 5A and 9, when the pivot pin 40 is disposed in the locked position, the first externally splined portion 41 engages the handle internal splines 31 of the handle aperture 30 of the first handle 21 and the jaw element internal splines 28 of the jaw element aperture 27 of the first jaw element 24, thus fixedly interconnecting the first handle 21 with the first jaw element 24, and the second externally splined portion 45 engages the handle internal splines 31 of the handle aperture 30 of the second handle 22 and the jaw element internal splines 28 of the jaw element aperture 27 of the second jaw element 25, thus fixedly interconnecting the second handle 22 with the second jaw element 25, so that the second handle 22 and the second jaw element 25 are pivotally movable together about the pivot axis A relative to the first handle 21 and the first jaw element 24, because the second externally splined portion 43 is rotatable relative to the first externally splined portion 41. In the locked position, the third externally splined portion 45 is disposed outside of the handle aperture 30 of the second handle 22, and the smooth portion 48 is disposed adjacent to the handle internal splines 31 of the handle aperture 30 of the second handle 22, as shown in FIG. 9, but because the outer diameter of the smooth portion 48 is less than the first splined portion outer diameter defined by the first externally splined portion 42, the smooth portion 48 does not interfere with or engage the handle internal splines 31 of the second handle 22.

Figure 6:
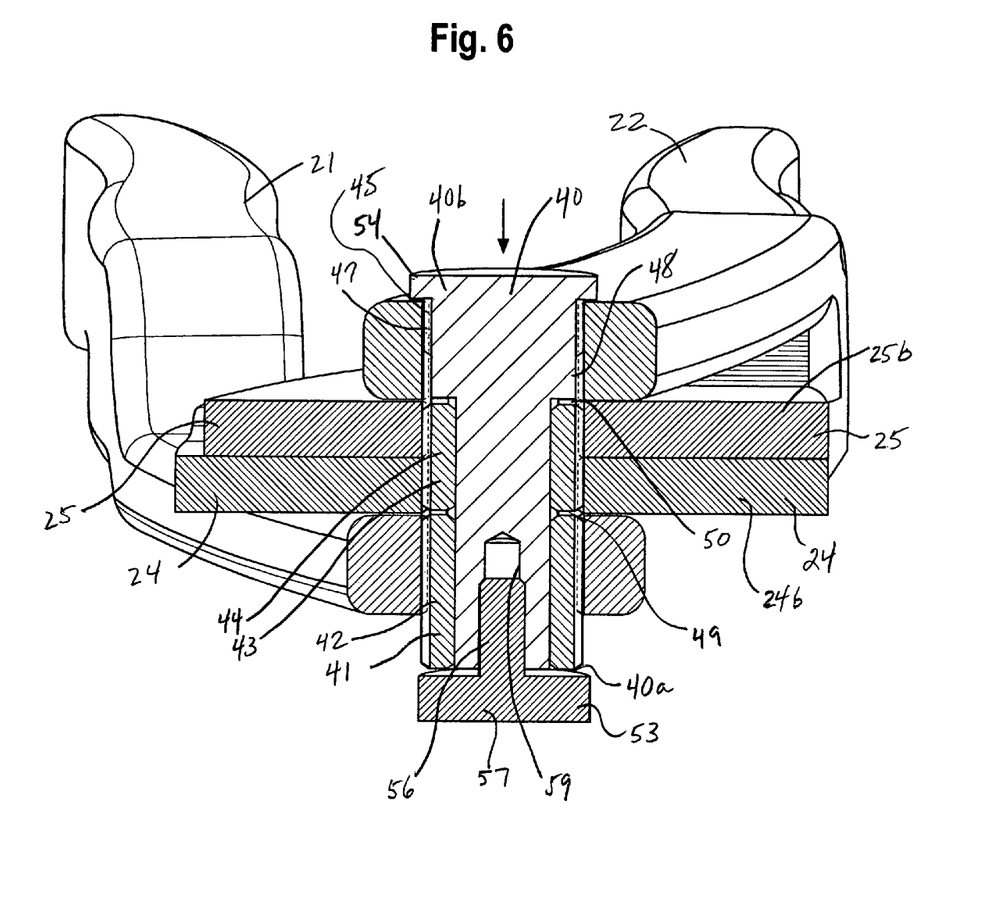
FIG. 6 is a view similar to FIG. 5A, but depicting the pin in the unlocked position.
Figure 10:
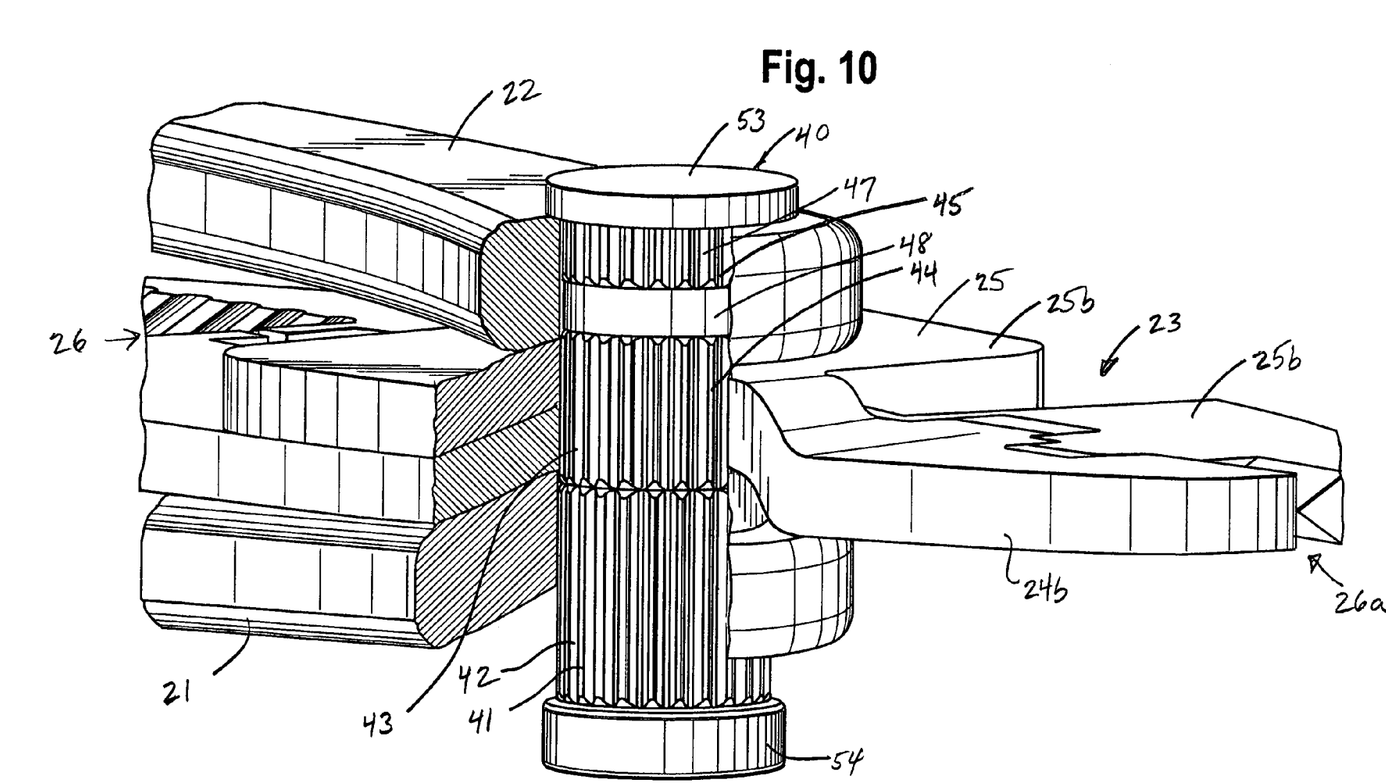
FIG. 10 is an enlarged, fragmentary, side perspective view of the adjustable jaw pliers type of FIG. 1 depicting the pin in the unlocked position.

As shown in FIGS. 6 and 10; when the pivot pin 40 is disposed in the unlocked position, the first externally splined portion 41 engages only the handle internal splines 31 of the handle aperture 30 of the first handle 21, the second externally splined portion 43 engages the jaw element internal splines 28 of the jaw apertures 27 of the first and second jaw elements 24, 25, and the third externally splined portion 45 engages the handle internal splines 31 of the handle aperture 30 of the second handle 22, so that the first and second jaw elements 24, 25 are fixedly interconnected with each other and are pivotally movable together about the pivot axis A relative to first and second handles 21, 22, which are fixedly interconnected with each other because the third externally splined portion 47 is nonrotatable relative to the first externally splined portion 41 and the second externally splined portion 43 is rotatable relative to the first and third externally splined portions 41, 45.

Figure 7:
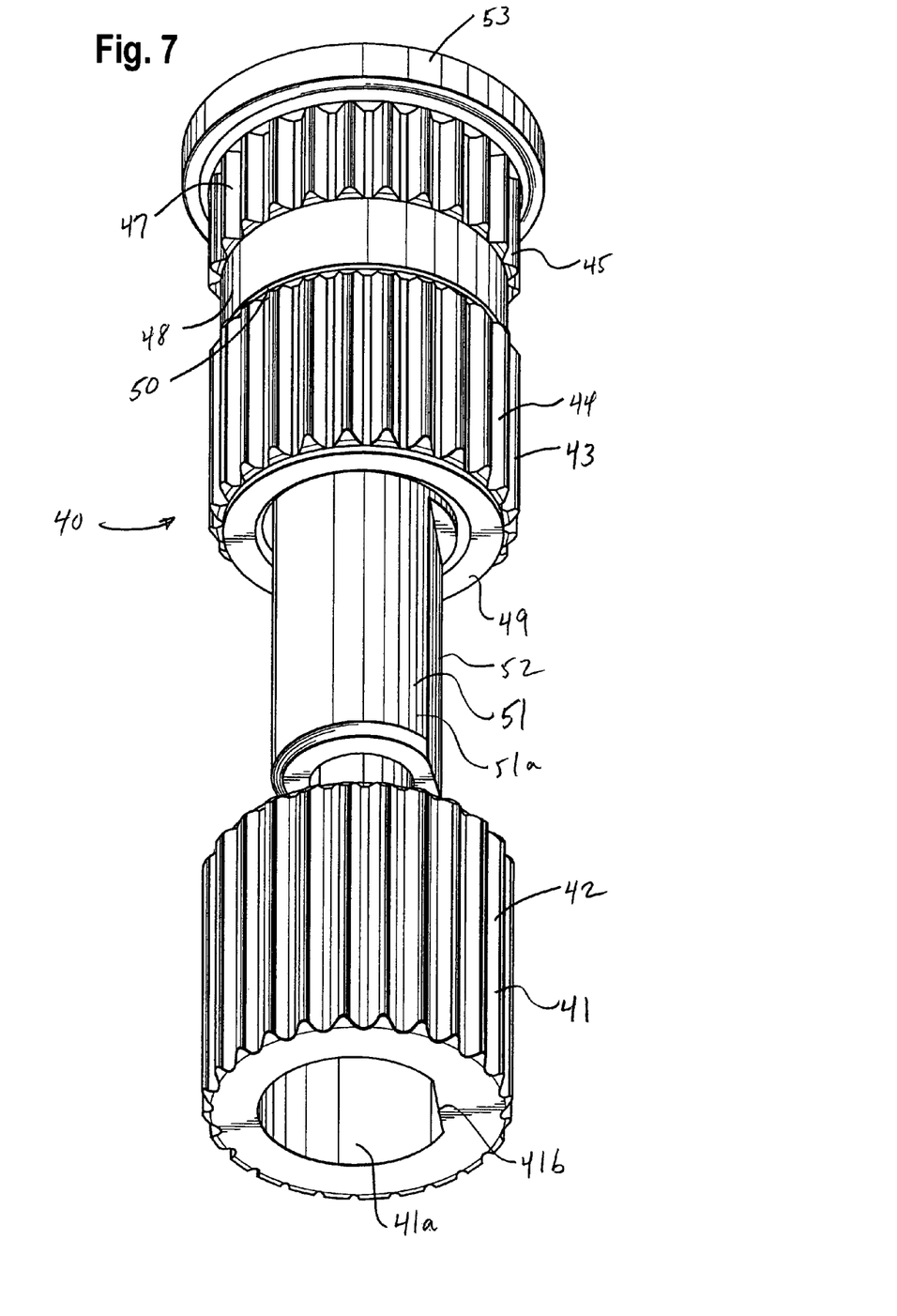
FIG. 7 is an enlarged, perspective view of the pin in FIG. 1 depicted in a disassembled condition.

Referring to FIGS. 6 and 7, in an embodiment, the first and second externally splined portions 41, 43 are separated from each other by a first annulus member 49 disposed therebetween. In an embodiment, the second and third externally splined portions 43, 45 are separated from each other by a second annulus member 50 disposed therebetween.

Referring still to FIG. 7, in an embodiment, the pivot pin 40 includes a substantially cylindrical shaft 51. In an embodiment, the first and third externally splined portions 41, 45 are formed by annuli that are integral with or fixedly coupled to the shaft 51 in a well-known manner, such as, for example, weldment, adhesion, or press-fit, and the second externally portion 43 is formed by an annulus that is rotatable relative to the shaft 51. In an embodiment, the shaft 51 includes an outer surface 51a having a shaft flattened portion 52 adjacent to the first portion 41, and the first externally splined portion 41 includes an inner surface 41a having a flattened portion 41b that is adapted to abuttingly engage the shaft flattened portion 52 to prevent rotation of the first externally splined portion 41 relative to the shaft 51.

In an embodiment, the pivot pin 40 includes first and second ends 40a, 40b having respective first and second stops 53, 54 with an outer diameter that is greater than the inner diameter of the handle apertures 30 of the first and second handles 21, 22, and which are adapted to abut the surfaces of the handles 21, 22 adjacent to the handle apertures 30 to prevent the pivot pin 40 from being inadvertently removed from the pliers-type tool 20 when the pin 40 is axially moved to and from the locked and unlocked positions along the pivot axis A. In an embodiment, the first stop 53 comprises a screw member 55 having a screw shank 56 and head 57, wherein the shank 56 is adapted to threadingly engage inner threads disposed in an axial bore 59 disposed in the shaft 51. In an embodiment, the screw member 55 secures the first externally splined portion 41 to the shaft 51 to prevent inadvertent removal of the first externally splined portion 41 from the shaft 51.

In an embodiment, the first portions 24a, 25a of the jaw elements 24, 25 are respectively disposed in a stepped, non-planar relation relative to the second portions 24b, 25b. In an embodiment, second portions 24b, 25b of the tool head 23 may respectively include second jaw surfaces 24c, 25c to form second jaws that cooperatively define a second jawed tool structure 26a that is diametrically opposed to the first jawed tool structure 26, the first portions 24a, 25a and second portions 24b, 25b adapted to be respectively pivotally moveable relative to each other about the axis A. In an embodiment, the first portions 24a, 25a are respectively unitary with the second portions 24b, 25b.

It will be appreciated that, with the pliers-type tool 20 disclosed herein, a user can axially move the pivot pin 40 along the pivot axis A from the locked position to the unlocked position, then rotate the tool head 23 relative to the handles 21, 22 until the desired angular position of either the first or second jawed tool structure 26, 26a is achieved, and then dispose the pivot pin 40 in the locked position. It will further be appreciated that while the first and second jawed tools structures 26, 26a are depicted in the drawings as a wire stripping tool and wire crimping tool, respectively, first and second jawed tools structures 26, 26a can be any type of jawed tool structures, while not departing from the true scope and spirit of the present application.

Also disclosed herein is a method of selectively disposing a tool head of a pliers-type tool in any one of a plurality of angular positions relative to first and second handles of the pliers-type tool, the tool head being formed by opposing first and second jaw elements, each jaw element having a jaw aperture disposed therein with the jaw apertures having a common pivot axis, each of the first and second handles includes a handle aperture therein that is coaxial with the jaw apertures, the pliers-type tool includes a pivot pin disposed axially through the jaw apertures and the handle apertures and is axially movable relative thereto between locked and unlocked positions. The method comprises fixedly interconnecting the handles with each other and freeing the jaw elements for pivotal movement relative to the handles by moving the pivot pin to the unlocked position, rotating the jaw elements about the axis relative to the handles to a desired angular position, and freeing the handles for pivotal movement relative to each other and fixedly interconnecting the first and second handles respectively with the first and second jaw elements by moving the pivot pin to the locked position. The method may further comprise pivotally moving the handles relative to each other about the axis to cause relative movement of the jaw elements while the pin is in the locked position.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

The invention claimed is:

1. An indexable pliers-type tool comprising:
   first and second opposing jaw elements having first and second portions, the first portions being juxtaposed relative to each other and forming first jaws cooperating to define a first tool structure, the second portions being substantially superposed relative to each other and each having a jaw aperture disposed therein with the jaw apertures having a common pivot axis, wherein the jaw elements are adapted to be pivotally moveable relative to each other about the axis,
   first and second handles adapted to be respectively fixedly interconnected with the first and second jaw elements, each handle having a handle aperture therein coaxial with the jaw apertures; and
   a pivot pin disposed axially through the jaw apertures and the handle apertures and being axially movable relative thereto between locked and unlocked positions, wherein when the pin is disposed in the locked position, the first handle is fixedly interconnected with the first jaw element and the second handle is fixedly interconnected with the second jaw element and the handles are pivotally movable relative to each other about the axis, and when the pin is disposed in the unlocked position, the handles are fixedly interconnected with each other and the jaw elements are fixedly interconnected with each other and are pivotally movable about the axis relative to the handles.

2. The pliers-type tool as claimed in claim 1 wherein each of the jaw apertures and the handle apertures includes a plurality of internal splines circumferentially disposed on inner surfaces thereof.

3. The pliers-type tool as claimed in claim 2 wherein the pin includes a first externally splined portion, a second externally splined portion that is rotatable relative to the first externally splined portion, a third externally splined portion that is non-rotatable relative to the first externally splined portion and axially spaced from the second externally splined portion, wherein when the pin is in the locked position, the first externally splined portion engages the internal splines of the first handle and the first jaw element, and the second externally splined portion engages the internal splines of the second handle and the second jaw element so that the second handle and second jaw element can pivot together about the axis relative to the first handle and the first jaw element, and when the pin is in the unlocked position, the first externally splined portion engages the internal splines of the first handle, the second externally splined portion engages the internal splines of the first and second jaw elements, and the third externally splined portion engages the internal splines of the second handle so that the first and second jaw elements can pivot together about the axis relative to the first and second handles.

4. The pliers-type tool as claimed in claim 3 wherein the second and third externally splined portions are axially spaced apart by a substantially smooth portion.

5. The pliers-type tool as claimed in claim 3 wherein the first, second and third externally splined portions have respective first, second and third lengths, the third length being shorter than the second length and the second length being shorter than the first length.

6. The pliers-type tool as claimed in claim 3 wherein the first and second externally splined portions are separated by an annulus member.

7. The pliers-type tool as claimed in claim 4 wherein the second externally splined portion and the smooth portion are separated by an annulus member.

8. The pliers-type tool as claimed in claim 3 wherein the pin includes a cylindrical shaft.

9. The pliers-type tool as claimed in claim 8 wherein the first and third externally splined portions are annuli fixedly coupled to the shaft.

10. The pliers-type tool as claimed in claim 9 wherein the second externally splined portion is an annulus rotatable relative to the shaft.

11. The pliers-type tool as claimed in claim 9 wherein the shaft includes an outer surface having a shaft flattened portion adjacent to the first externally splined portion and the first externally splined portion includes an inner surface having a flattened portion that is adapted to engage the shaft flattened portion to prevent rotation of the first externally splined portion relative to the shaft.

12. The pliers-type tool as claimed in claim 1 wherein the pin includes first and second ends having respective first and second stops, the stops having an outer diameter greater than a diameter of the handle apertures and are adapted to abut the first and second handles to prevent the pin from being removed from the tool when the pin is axially moved.

13. The pliers-type tool as claimed in claim 1 wherein the second portions of the first and second jaw elements respectively include second jaw surfaces to form second jaws cooperating to define a second tool structure that is diametrically opposed relative to the first tool structure.

14. The pliers-type tool as claimed in claim 13 wherein the first portions of the first and second jaw elements are respectively unitary with the second portions of the first and second jaw elements.

15. The pliers-type tool as claimed in claim 1 wherein the second portions of the first and second jaw elements are in stepped, non-planar relation with the respective first portions of the first and second jaw elements.

16. A pliers-type tool having a tool head defining a first tool structure capable of being selectively disposed in any one of a plurality of angular positions relative to first and second handles of the pliers-type tool, comprising:
   first and second jaws elements having first and second portions, the first portions being juxtaposed relative to each other and forming first jaws cooperating to define the first tool structure, each of the jaw elements having a jaw aperture disposed therein with the jaw apertures having a common pivot axis, each of the jaw apertures includes internal splines circumferentially disposed on an inner surface thereof, wherein the jaw elements are adapted to be pivotally moveable relative to each other about the axis,
   the first and second handles adapted to be respectively fixedly interconnected with the first and second jaw elements, each handle having a handle aperture disposed therein coaxial with the jaw apertures, each handle aperture includes internal splines circumferentially disposed on an inner surface thereof; and
   a pivot pin disposed axially through the jaw apertures and the handle apertures and being axially movable relative thereto between a locked position, wherein the first handle is fixedly interconnected with the first jaw element and the second handle is fixedly interconnected with the second jaw element and the handles are pivotally movable relative to each other about the axis, and an unlocked position, wherein the handles are fixedly interconnected with each other and the jaw elements are fixedly interconnected with each other and are pivotally movable about the axis relative to the handles, the pin includes a first externally splined portion, a second externally splined portion that is rotatable relative to the first externally splined portion, and a third externally splined portion that is nonrotatable relative to the first externally splined portion and axially spaced from the second externally splined portion, wherein when the pin is in the locked position, the first externally splined portion engages the internal splines of the first handle and the first jaw element, and the second externally splined portion engages the internal splines of the second handle and the second jaw element so that the second handle and second jaw element can pivot together about the axis relative to the first handle and the first jaw element, and when the pin is in the unlocked position, the first externally splined portion engages the internal splines of the first handle, the second externally splined portion engages the internal splines of the first and second jaw elements, and the third externally splined portion engages the internal splines of the second handle so that the first and second jaw elements can pivot together about the axis relative to the first and second handles.

17. The pliers-type tool as claimed in claim 16 wherein the second portions of the first and second jaw elements respectively include second jaw surfaces to form second jaws that cooperate to define a second tool structure that is diametrically opposed relative to the first tool structure.

18. The pliers-type tool as claimed in claim 17 wherein the first portions of the first and second jaw elements are respectively unitary with the second jaw surface of the second portions of the first and second jaw elements.

19. The pliers-type tool as claimed in claim 16 wherein the second portions of the first and second jaw elements are in stepped, non-planar relation with the respective first portions of the first and second jaw elements.

20. A pliers-type tool having first and second handles and first and second opposing jaw sets respectively defining first and second tool structures, each tool structure adapted to be selectively disposed in any one of a plurality of angular positions relative to the handles, the pliers-type tool comprising:

first and second opposing jaw elements having first and second portions and being juxtaposed relative to each other such that the first tool structure is formed by the first portions of the jaw elements and the second tool structure is formed by the second portions of the jaw elements, each jaw element includes a jaw aperture disposed therein with the jaw apertures having a common pivot axis, wherein the first portions are adapted to be pivotally moveable relative to each other about the axis and the second portions are adapted to be pivotally moveable relative to each other about the axis;

the first and second handles are adapted to be respectively fixedly interconnected with the first and second jaw elements, each handle having a handle aperture that is coaxial with the jaw apertures; and a pivot pin disposed axially through the jaw apertures and the handle apertures and being axially movable relative thereto between locked and unlocked positions, wherein when the pin is disposed in the locked position, the first handle is fixedly interconnected with the first jaw element and the second handle is fixedly interconnected with the second jaw element and the handles are pivotally movable relative to each other about the axis, and when the pin is disposed in the unlocked position, the handles are fixedly interconnected with each other and the jaw elements are fixedly interconnected with each other and are pivotally movable about the axis relative to the handles.

21. The pliers-type tool as claimed in claim 20 wherein each of the jaw apertures and the handle apertures has a plurality of internal splines circumferentially disposed on inner surfaces thereof.

22. The pliers-type tool as claimed in claim 21 wherein the pin includes a first externally splined portion, a second externally splined portion that is rotatable relative to the first externally splined portion, and a third externally splined portion that is nonrotatable relative to the first externally splined portion and axially spaced from the second externally splined portion, wherein when the pin is in the locked position, the first externally splined portion engages the internal splines of the first handle and the first jaw element, and the second externally splined portion engages the internal splines of the second handle and the second jaw element so that the second handle and second jaw element can pivot together about the axis relative to the first handle and the first jaw element, and when the pin is in the unlocked position, the first externally splined portion engages the internal splines of the first handle, the second externally splined portion engages the internal splines of the first and second jaw elements, and the third externally splined portion engages the internal splines of the second handle so that the first and second jaw elements can pivot together about the axis relative to the first and second handles.

23. A method of selectively disposing a tool head of a pliers-type tool in any one of a plurality of angular positions relative to first and second handles of the pliers-type tool, the tool head being formed by opposing first and second jaw elements, each jaw element having a jaw aperture disposed therein with the jaw apertures having a common pivot axis, each of the first and second handles includes a handle aperture therein that is coaxial with the jaw apertures, the pliers-type tool includes a pivot pin disposed axially through the jaw apertures and the handle apertures and is axially movable relative thereto between locked and unlocked positions, the method comprising:

fixedly interconnecting the handles with each other and freeing the jaw elements for pivotal movement relative to the handles by moving the pivot pin to the unlocked position;

rotating the jaw elements about the axis relative to the handles to a desired angular position; and freeing the handles for pivotal movement relative to each other and fixedly interconnecting the first and second handles respectively with the first and second jaw elements by moving the pivot pin to the locked position.

24. The method as claimed in claim 23 further comprising pivotally moving the handles relative to each other about the axis to cause relative movement of the jaw elements while the pin is in the locked position.

* * * * *